UNITED STATES PATENT OFFICE.

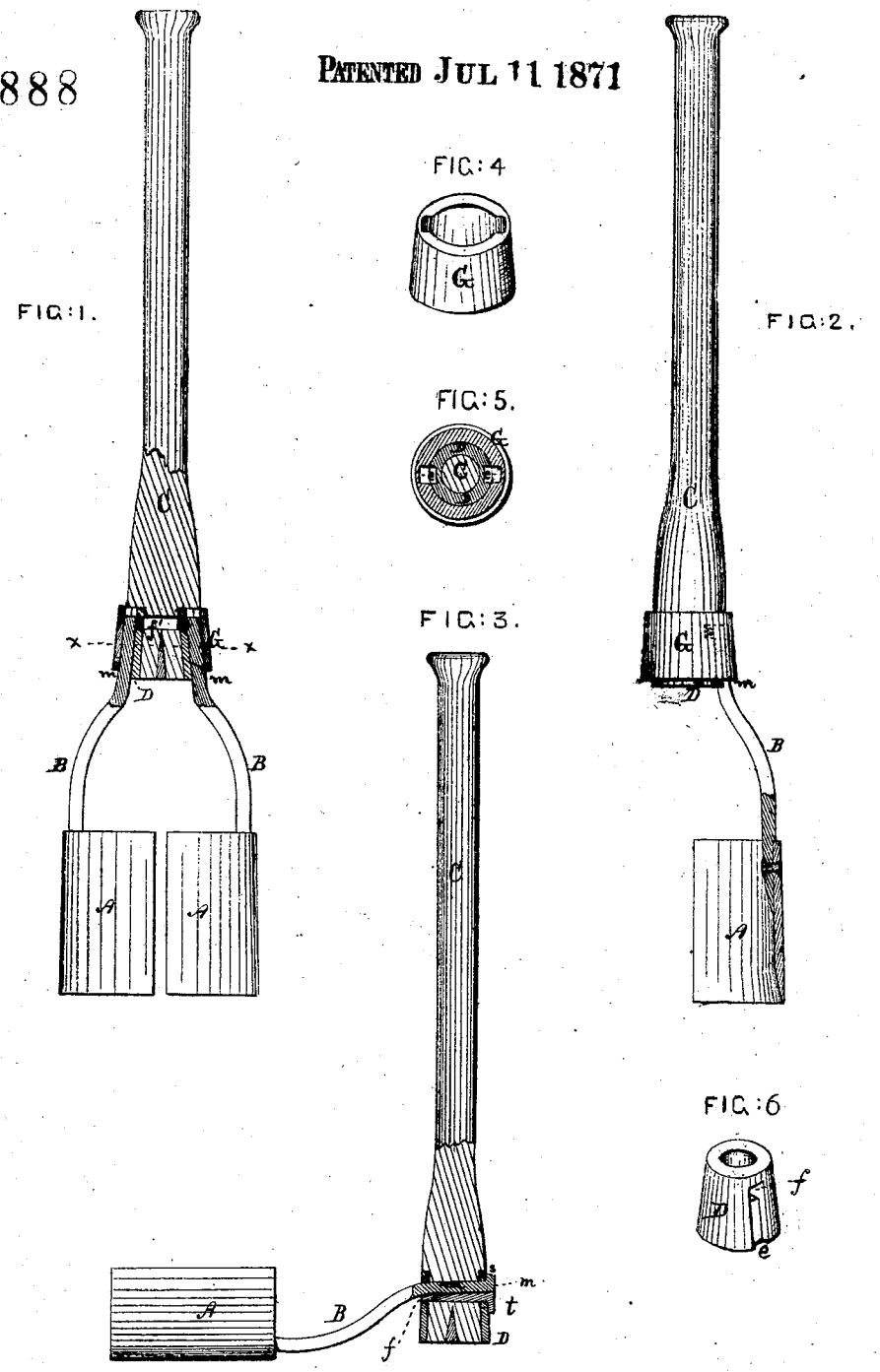

JOSEPH THOMPSON, OF DECATUR, MICHIGAN.

IMPROVEMENT IN COMBINED SHOVEL AND POST-HOLE DIGGERS.

Specification forming part of Letters Patent No. 116,888, dated July 11, 1871.

*To all whom it may concern:*

Be it known that I, JOSEPH THOMPSON, of Decatur, in the county of Van Buren and State of Michigan, have invented an Improved Shovel and Post-Hole Digger, of which the following is a specification:

My invention relates to an improved detachable attachment of curved or partially-cylindrical blades with a suitable handle, as hereinafter described, whereby the blades may be so disposed and secured as to form either a complete post-hole digger, (see Fig. 1,) a shovel or spade, (see Fig. 2,) or a brier-hoe or scoop for digging wells. (See Fig. 3.)

Figure 1 illustrates my post-hole digger constructed of two blades, the lower end of the handle being in section. Fig. 2 represents the instrument with one blade only attached to the handle, for use as a spade or shovel. Fig 3 represents the instrument with one blade secured, so as to form a brier-hoe, or a scoop for use in digging wells. Fig. 4 illustrates the ferrule-ring sliding upon end of handle in perspective. Fig. 5 is a transverse section in lines $x$ $x$ of Fig. 1.

A A are blades of steel, made nearly semi-cylindrical in form and of any suitable length. B B are steel rods, to which the upper ends of the blades are firmly secured. C is the handle, made of wood of any desired length. D is an extended metallic ferrule, firmly binding the lower end of the handle C. Longitudinal grooves or channels $e\ e$ (see Fig. 6) are cut or formed in this ferrule at opposite points of its circumference, terminating at their upper end in apertures $f\ f$ cut through the ferrule. An aperture, $f'$, is cut through the handle to correspond with the apertures $f\ f$ of the ferrule, as illustrated in the drawing. The steel rods B B are so curved as to approach each other above the blades A A when said blades are placed with their concavities opposite, as illustrated in Fig. 1, and are bent to form, at their upper ends, straight arms $m\ m$, in length equal to the length of the grooves $e\ e$ in the ferrule D, (see Fig. 6,) and of such a width as to fit closely therein. These arms terminate in inward projections or tenons $s\ s$, Figs. 1 and 3, made to fit closely into the apertures or mortises $f\ f$, as illustrated in Fig. 1. G, Fig. 4, is a sliding ring or ferrule made to fit down closely over and embrace the ferrule D. The inner perimeter of this ring is grooved longitudinally at opposite points, with recesses corresponding in width with the grooves $e\ e$ in the ferrule D, and of such depth as to embrace and bear closely upon the projecting thickness of the arms $m\ m$ of the rods B when they are inserted in place in the grooves of said ferrule D, as shown in Figs. 1, 4, and 5. Thus, by sliding down the ring G over the arms $m\ m$, when they are attached to the handle C by their tenons and the corresponding apertures or mortises, the ferrule D, the rods B B, and their spades are firmly and rigidly secured to said handle. When the spades A A are thus secured to the handle B they form a divided tubular cutter, as shown in Fig. 1, admirably adapted for digging post-holes in clear or sandy soil. As the inner edges of the blades are slightly beveled they are forced open slightly as they are pressed into the ground, so that the elasticity of the rods B B is made to operate in compressing and holding the earth forced up between the blades. By removing one spade the other may be used as an efficient scoop, spade, or shovel. By passing the arm $m$ of one of the blades entirely through the opening $f'$ in the handle and inserting a wedge or key, $t$, under the same, the blade is readily secured at right angles to the handle, so as to form an efficient brier-hoe or a scoop for use in excavating or in cleaning out wells, as shown in Fig. 3.

I do not claim herein as new the divided tubular cutter formed by the combination of the blades A A, nor the attachment of the cutter-blades to the handle by means of steel rods.

I claim as my invention—

The combination of the shank $m$ of either blade of a divided detachable tubular cutter or post-hole digger with an aperture, $f$, in its handle, and with a key or wedge, $t$, for securing the same in position at right angles to said handle, substantially as and for the purpose herein set forth.

JOSEPH THOMPSON.

Witnesses:
JOHN B. UPTON,
HUBBELL G. SIMPSON.